US008326955B2

(12) United States Patent
Airo et al.

(10) Patent No.: US 8,326,955 B2
(45) Date of Patent: Dec. 4, 2012

(54) CONFIGURATION OF USER TERMINAL SETTINGS IN COMMUNICATIONS SYSTEM (75) Inventors: Ville Airo, Espoo (FI); Jussi Vainionpää, Helsinki (FI); Antti Poikela, Espoo (FI)

(73) Assignee: TeliaSonera AB, Stockholm (SE)

( * ) Notice: Subject to any disclaimer, the term of this patent is extended or adjusted under 35 U.S.C. 154(b) by 0 days.

(21) Appl. No.: 12/735,678

(22) PCT Filed: Feb. 5, 2009

(86) PCT No.: PCT/FI2009/050096
§ 371 (c)(1),
(2), (4) Date: Nov. 4, 2010

(87) PCT Pub. No.: WO2009/098359
PCT Pub. Date: Aug. 13, 2009

(65) Prior Publication Data
US 2011/0047254 A1 Feb. 24, 2011

(30) Foreign Application Priority Data
Feb. 8, 2008 (FI) .................................... 20085112

(51) Int. Cl.
*G06F 15/177* (2006.01)
(52) U.S. Cl. ..................... 709/222; 709/220; 709/221
(58) Field of Classification Search ........... 709/220–222
See application file for complete search history.

(56) References Cited

U.S. PATENT DOCUMENTS

| 4,851,997 | A * | 7/1989 | Tatara | 709/228 |
| 7,248,576 | B2 * | 7/2007 | Hoffmann | 370/352 |
| 7,266,594 | B2 * | 9/2007 | Kumbalimutt et al. | 709/221 |
| 2002/0059404 | A1 * | 5/2002 | Schaaf et al. | 709/220 |
| 2003/0027581 | A1 | 2/2003 | Jokinen et al. | |
| 2004/0006573 | A1 * | 1/2004 | Takashi | 707/104.1 |
| 2004/0249984 | A1 * | 12/2004 | Das et al. | 709/249 |
| 2007/0058617 | A1 * | 3/2007 | Stiemerling et al. | 370/352 |
| 2008/0245279 | A1 * | 10/2008 | Pan | 108/144.11 |
| 2010/0005166 | A1 * | 1/2010 | Chung | 709/224 |
| 2011/0047254 | A1 * | 2/2011 | Vainionpaa et al. | 709/222 |

FOREIGN PATENT DOCUMENTS

| EP | 1422899 A1 | 5/2004 |
| WO | WO 2005/015925 A2 | 2/2005 |
| WO | WO 2006/005790 A1 | 1/2008 |
| WO | WO 2008/001231 A2 | 1/2008 |

OTHER PUBLICATIONS

Sinnreich, H. et al., SIP Telephone Device Requirements, IETF Standard Working-Draft, 20020221, Internet Engineering Task Force, IETF, CH, sivut 1-24, kappaleet 3, 5 ja 9.2.3, Feb. 21, 2002. Series 60 Developer Platform: "Series 60 Developer Platform 2.0: OMA Client Provisioning Version 1.1," Jun. 9, 2004.
Opening Mobile Alliance: "Provisioning Bootstrap," Jun. 28, 2005.
Open Mobile Alliance: "OMA Provisioning Architecture Overview Candidate Version 1.1 OMA-WAP-ProvArch-V1_1-20050428-C," Apr. 28, 2005.

* cited by examiner

*Primary Examiner* — Mohamed Wasel
(74) *Attorney, Agent, or Firm* — Cozen O'Connor (57) ABSTRACT

A method for configuring SIP settings to a user terminal, for instance when a specific SIP service is used in the user terminal for the first time, includes transmitting a request message from the user terminal to a gateway node. As the request message is received in the gateway node, the gateway node retrieves identification information on the user terminal. After that the request message and the retrieved identification information are forwarded from the gateway node to a settings server. In response to receiving the request message and the identification information, the settings server defines service-specific SIP settings for the user terminal, and the defined SIP settings are provided to the user terminal.

22 Claims, 5 Drawing Sheets

CONFIGURATION OF USER TERMINAL SETTINGS IN COMMUNICATIONS SYSTEM

PRIORITY CLAIM

This is the U.S. national stage of application No. PCT/FI2009/050096, filed on 5 Feb. 2009. Priority is claimed from Finland Patent Application No. 20085112, filed 8 Feb. 2008, the entire content of which is expressly incorporated herein by reference.

FIELD OF THE INVENTION

The present invention relates to IP telephony, and more particularly to the configuration of parameter settings of a user terminal.

BACKGROUND OF THE INVENTION

A session initiation protocol (SIP) refers to a control protocol for creating, modifying, and terminating sessions with one or more participants. SIP operates at an application layer of a communications system. Basically, SIP is a connection set-up protocol; the actual data is carried otherwise. SIP-capable user terminals are becoming more and more common. For example, Symbian OS 9.2 mobile phones supplied by several vendors are SIP compatible.

SIP applications running on a user terminal require the configuration of user terminal SIP settings. The SIP settings of the user terminal may be configured manually by the user. However, one of the problems with that approach is that configuring the SIP parameter settings manually is laborious and error-prone since a lot of information has to be entered by using the user terminal's (such as a mobile phone) limited keyboard. Also, a way of providing the settings to the user terminal is required.

WO 2006/005 790 describes a system for an automatic delivery of network configuration parameters from a network to a dynamic host configuration protocol (DHCP) server. It provides an auto-configuration of configuration parameters from network servers to hosts such as mobile terminals. According to WO 2006/005 790, if a configuration storage cannot provide the requested configuration information, the configuration storage tries to retrieve the configuration information from a network so that further requests for the missing pieces of configuration information would be successful. The DHCP server is connected to a dynamically updated configuration storage. The configuration storage stores configuration parameters such as a domain name server (DNS), e-mail, session initiation protocol (SIP), or other service dependent or independent parameters required in a terminal device to enable a specific service or application. An example of a simple format of a configuration parameter is an internet protocol (IP) address or a uniform resource locator (URL) address of a server providing a particular service. The configuration storage delivers requested configuration parameters to the DHCP server by a server's request. In the configuration storage, each service entry contains network server-specific information such as: a) a unique service identifier identifying the service in a global scope (for example, a globally unique internet assigned numbers authority (IANA) vendor ID and vendor-specific unique service ID); b) configuration data represented in a service-specific or service-independent format such that both the client and server application have the same interpretation of the data; and/or c) a time-to-live (TTL) value for the configuration data.

However, WO 2006/005 790 does not deal with actually bringing the SIP configuration to the user terminal. Although DHCP might be able to provide the required parameters, it is, however, in practise used for lower level IP configuration. SIP settings (or other settings above the IP layer) cannot be brought into current user terminals by means of DHCP. DHCP is more like a feature implemented by an operating system of the user terminal, by means of which certain network parameters are retrieved every time a data connection is formed. In addition, DHCP functions on top of an Internet protocol (IP), and, therefore, it functions only after an IP connection to a connection address has already been formed. The configuration of the SIP settings is bound to a certain connection address, such as a wireless application protocol (WAP) connection address, and DHCP cannot be used for configuring settings that are not strictly bound to the certain connection address. Examples of SIP settings that are not strictly bound to the certain connection address include a user SIP identity and a connection through which the SIP server is to be contacted. The DHCP configurable SIP enables finding, for example, a SIP service that happens to be present in a currently available network. However, the DHCP configurable SIP is not suitable for obtaining settings (such as the network connection used) for a specific SIP service necessary for a specific SIP application. For example, by means of DHCP the user terminal may find, via a wireless local area network (WLAN), a home voice over IP (VoIP) server, meaning that the application will not work since the application requires an application server which is located in the IMS system of the operator (and which is thus not present in the home VoIP network).

US 2004/0 153 548 A1 describes a configuration method for providing a configuration parameter such as a server, gateway or proxy server address(es) to a terminal device. Trigger control information defining trigger events and/or conditions is loaded to the terminal device and a discovery procedure for obtaining the configuration parameter(s) is initiated when at least one of the trigger events and/or conditions is detected. Thereby, configuration of services or server addresses can be provided to a moving mobile terminal.

US 2004/0 153 548 A1 describes a solution that is close to that of WO 06 005 790. However, US 2004/0 153 548 A1 does not relate to SIP settings. Further, US 2004/0 153 548 A1 merely concentrates on how to start the configuration. For example, it discloses that roaming or a cell change acts as a trigger for starting an undefined configuration, but it does not describe how the configuration is actually retrieved. It only lists examples such as DHCP. US 2004/0 153 548 A1, like WO 2006/005 790, merely concentrates on finding services that happen to be present in the currently available network.

BRIEF DISCLOSURE OF THE INVENTION

An object of the invention is thus to provide a method, communications system, user terminal, gateway node, settings server and a computer program product for implementing the method so as to solve the above problems. The objects of the invention are achieved by a method and an arrangement which are characterized by what is stated in the independent claims. Preferred embodiments of the invention are disclosed in the dependent claims.

The invention describes a solution for configuring control protocol settings (such as SIP settings) to a user terminal. The invention is based on the idea that in response to recognising an application-related action in the user terminal, a request message is transmitted from the user terminal to a gateway node. As the request message is received in the gateway node, the gateway node is configured to retrieve identification information on the user terminal. After that the request message and the retrieved identification information are transmitted from the gateway node to a settings server. In response to receiving the request message and the identification information, the settings server is configured to define application-specific control protocol settings for the user terminal and transmit the control protocol settings via the gateway node to the user terminal.

An advantage of the method and arrangement of the present invention is that mobile terminal SIP settings can be automatically (without user interaction) configured. The invention is applicable to any mobile phone SIP application. The invention does not require any interaction from the user and the user does not need to know the actual settings to be used.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The present solution differs from the prior-art solutions in that no network-based start-up of the configuration is necessary. Instead the configuration is initialised automatically for instance when a SIP application requiring a SIP configuration is started up in the user terminal for the first time. In the present solution the SIP settings are retrieved from the network. This is because the SIP settings may vary with time as the network operator changes its systems. By means of the present solution, the SIP settings can be automatically (without user interaction) configured for the user terminal. The automatic configuration of SIP settings to the user terminal is handled by the SIP application and a specific SIP service functionality. The SIP service functionality may be implemented in a single SIP service module which can be used by multiple SIP applications. The SIP service module utilises a hypertext transfer protocol (HTTP) request for retrieving SIP settings from a web server (also referred to as a settings server). A mobile subscriber international integrated services digital network (MSISDN) number of the user terminal is added to the HTTP request by a mobile network. Based on the request and MSISDN, a web server builds a user terminal-specific (or subscriber-specific) set of SIP settings (such as a profile name, service profile, default access point, public username, use compression, registration, use security, proxy server settings, and/or registrar server settings) and a user terminal-specific (or subscriber-specific) set of access point settings (such as a connection name, data bearer, access point name, user name, prompt password, password, authentication, and/or homepage) which are returned to the SIP service module. The web server may also carry out the provisioning of the SIP settings (and/or access point settings) to a SIP server. The SIP service module uses a native application programming interface (API) for configuring the SIP settings and the access point settings to the user terminal. The access point settings and the SIP settings may immediately be used by the SIP application after the created settings have been provided to the user terminal.

HTTP refers to a request/response standard between a client and a server, wherein the client is included in a user terminal and a web site represents the server. The client may make a HTTP request by using a web browser, spider, or other end-user tool referred to as a user agent. The responding server storing and/or creating resources, such as HTML (hypertext mark-up language) files and images, is called an origin server. In between the user agent and origin server, several intermediate network nodes may exist, for example, proxies, gateways, and tunnels. HTTP may be implemented on top of any protocol (e.g. TCP/IP (transmission control protocol/Internet protocol) and its supporting layers) on the Internet, or on other networks. However, HTTP is not limited to using TCP/IP. HTTP presumes a reliable transport, and any protocol that provides such guarantees may be used.

In the following, embodiments of the present solution will be described with reference to a cellular or wireless communications system, such as a third-generation (or beyond 3G) mobile communications system or WLAN (wireless local area network). However, the solution is not meant to be restricted to these embodiments. The present solution is applicable to any user terminal, network node, corresponding component(s), and/or to any communications system or any combination of different communications systems capable of utilizing a control protocol such as SIP. The communications system may be a fixed communications system or a wireless communications system or a communications system utilizing both fixed networks and wireless networks. The protocols used, the specifications of communications systems and network nodes, especially in mobile and wireless communication, develop rapidly. Such development may require extra changes to an embodiment. Therefore, all words and expressions should be interpreted broadly and they are intended to illustrate, not to restrict, the embodiment. The relevant inventive aspect is the functionality concerned, not the network element or equipment where it is executed.

Figure 1:
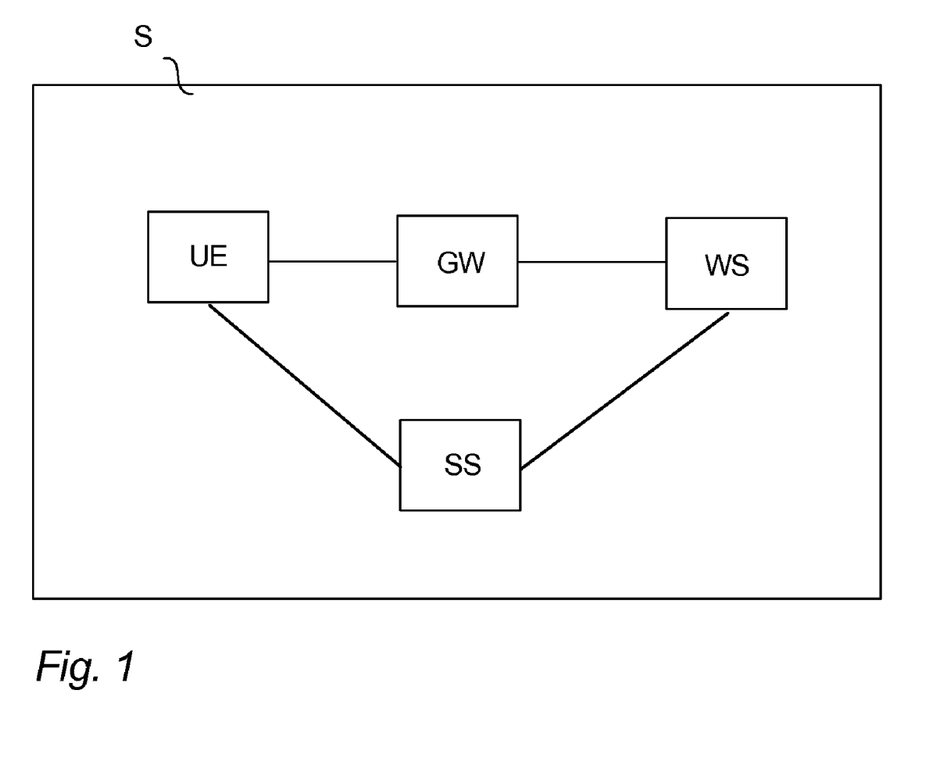
FIG. 1 illustrates a communications system according to the present solution.

FIG. 1 illustrates a communications system S according to an embodiment of the present solution. The system S comprises at least one user terminal UE that may be a mobile or wireless terminal, such as a mobile phone (mobile station), a personal digital assistant (PDA), a laptop or the like, capable of utilizing SIP protocol. The user terminal UE is connected to a core network (CN) (not shown) via an access network, such as a radio access network (RAN) (not shown) of a cellular network. The system S further includes a gateway node GW, such as a WAP gateway or a HTTP proxy, operated by a mobile network operator. The system S also includes a settings server WS such as a web server WS, for providing user terminal-specific SIP settings according to the present solution. The system S further includes a SIP server SS for interaction with a SIP client (i.e. UE) by using SIP protocol. FIG. 1 shows a simplified version of a cellular network structure, which only illustrates the components necessary for illustrating the present solution, even though those skilled in the art naturally know that a general communications system also comprises other functions and structures, which do not have to be described in more detail herein. Although each network node or function UE, GW, WS, SS has been depicted as one entity, different modules and memory may be implemented in one or more physical or logical entities. For example, GW and WS may physically recide in the same network entity, although they are logically separate entities.

Figure 2:
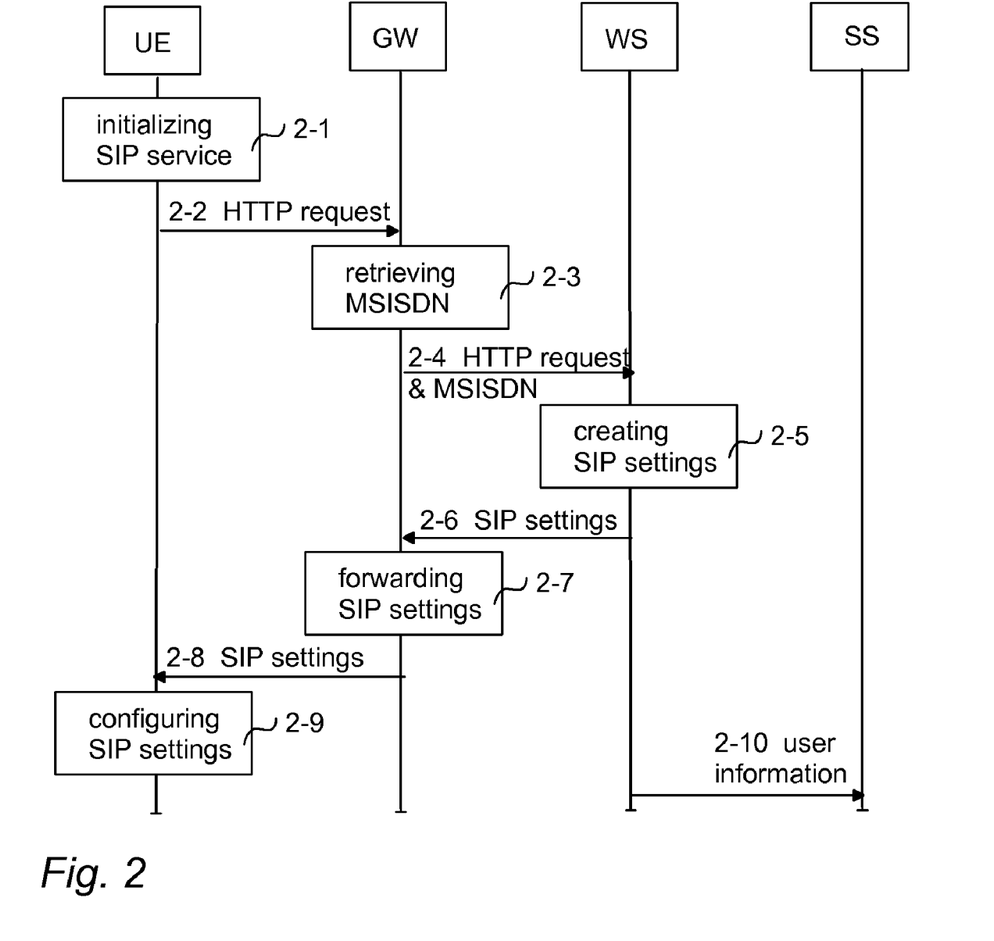
FIG. 2 illustrates signalling according to the present solution.

FIG. 2 illustrates signalling between network entities according to the present solution. In step 2-1, an initialising action is recognised in the user terminal UE, initialising a configuration process according to the present solution. Examples of such actions include using a specific SIP service for the first time and/or installing a specific SIP service in the user terminal. A HTTP request 2-2 is transmitted to the gateway node GW. In step 2-3, the HTTP request is received in the gateway node GW, wherein the gateway node retrieves 2-3 identification information on the user terminal UE from the mobile network, such as the MSISDN of the user terminal UE, and forwards 2-4 the HTTP request together with the identification information to the web server WS. In step 2-5, the HTTP request and the MSISDN are received in the web server WS. In response to receiving the HTTP request and MSISDN, the web server WS creates 2-5 user terminal specific SIP settings for the specific SIP service. The created SIP settings are then transmitted 2-6 from the web server WS to the gateway node GW. The gateway node GW receives 2-7 the SIP settings from the web server WS, and forwards 2-8 them to the user terminal UE. In step 2-9, the SIP settings are received in the user terminal UE. In response to receiving the SIP settings, the SIP settings of the user terminal are configured 2-9 according to the received SIP settings. This means that specific SIP settings of a specific SIP service are automatically set and stored in the user terminal. The configuration process may be quick and invisible from the user's point of view (even in roaming situations), so that the user does not need to notice that the SIP settings were retrieved from the network. The SIP settings are thus readily to be used by the user terminal. In message 2-10, information on the user terminal (user identification) may be transmitted to the SIP server SS.

Figure 3:
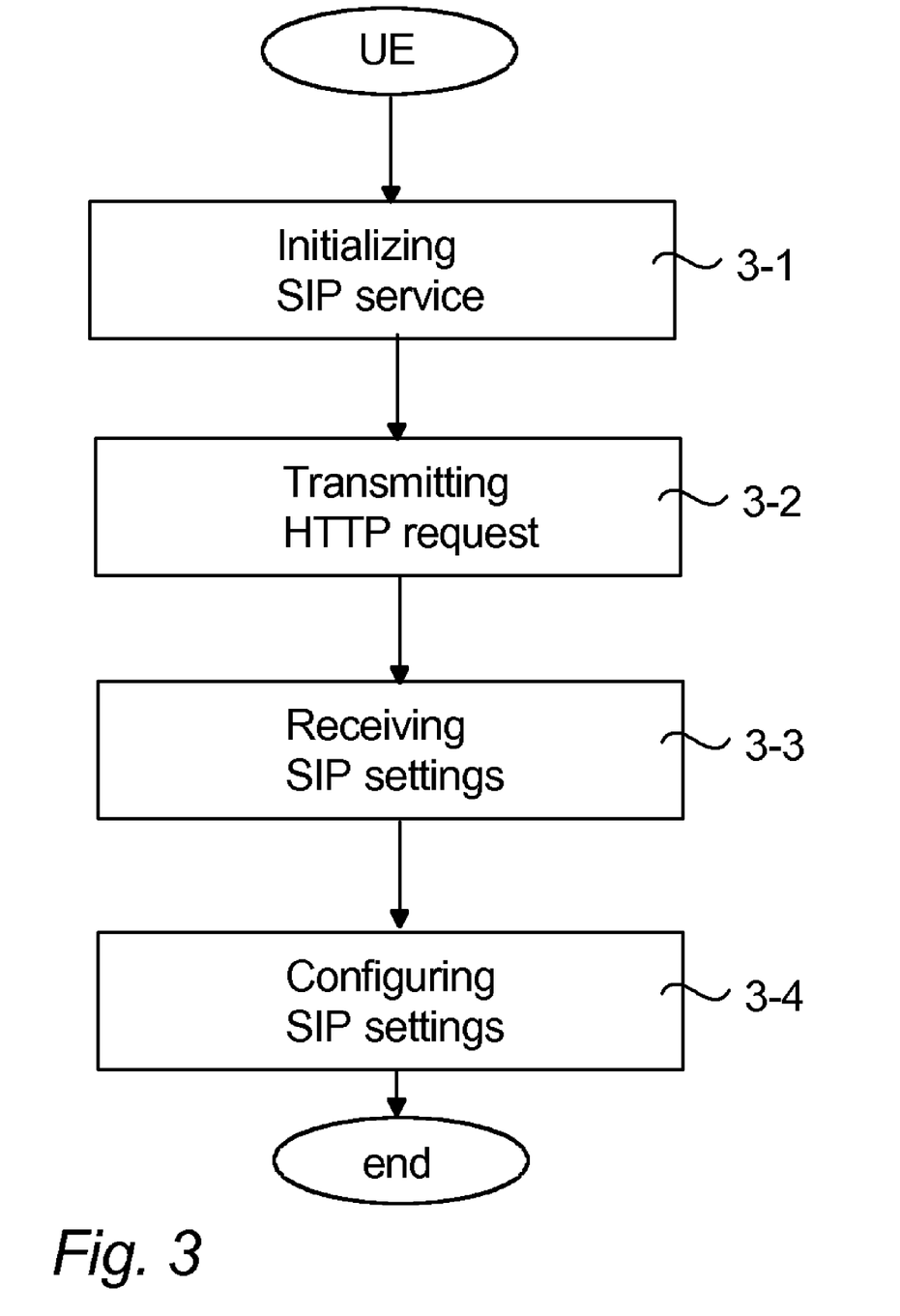
FIG. 3 is a flow chart illustrating the functioning of a user terminal according to the present solution.

FIG. 3 illustrates the functioning of a user terminal UE according to the present solution. In step 3-1, an initialising action is recognised in the user terminal UE, initialising a configuration process according to the present solution. Examples of such actions include using a specific SIP service for the first time and/or installing a specific SIP service in the user terminal UE. In step 3-2, a HTTP request is transmitted from UE to a gateway node GW. In step 3-3, user terminal-specific SIP settings created by a web server WS are received from the gateway node GW. In response to receiving the SIP settings, SIP settings of the user terminal are configured 3-4 according to the received SIP settings. This means that specific SIP settings of a specific SIP service are automatically set and stored in the user terminal UE.

Figure 4:
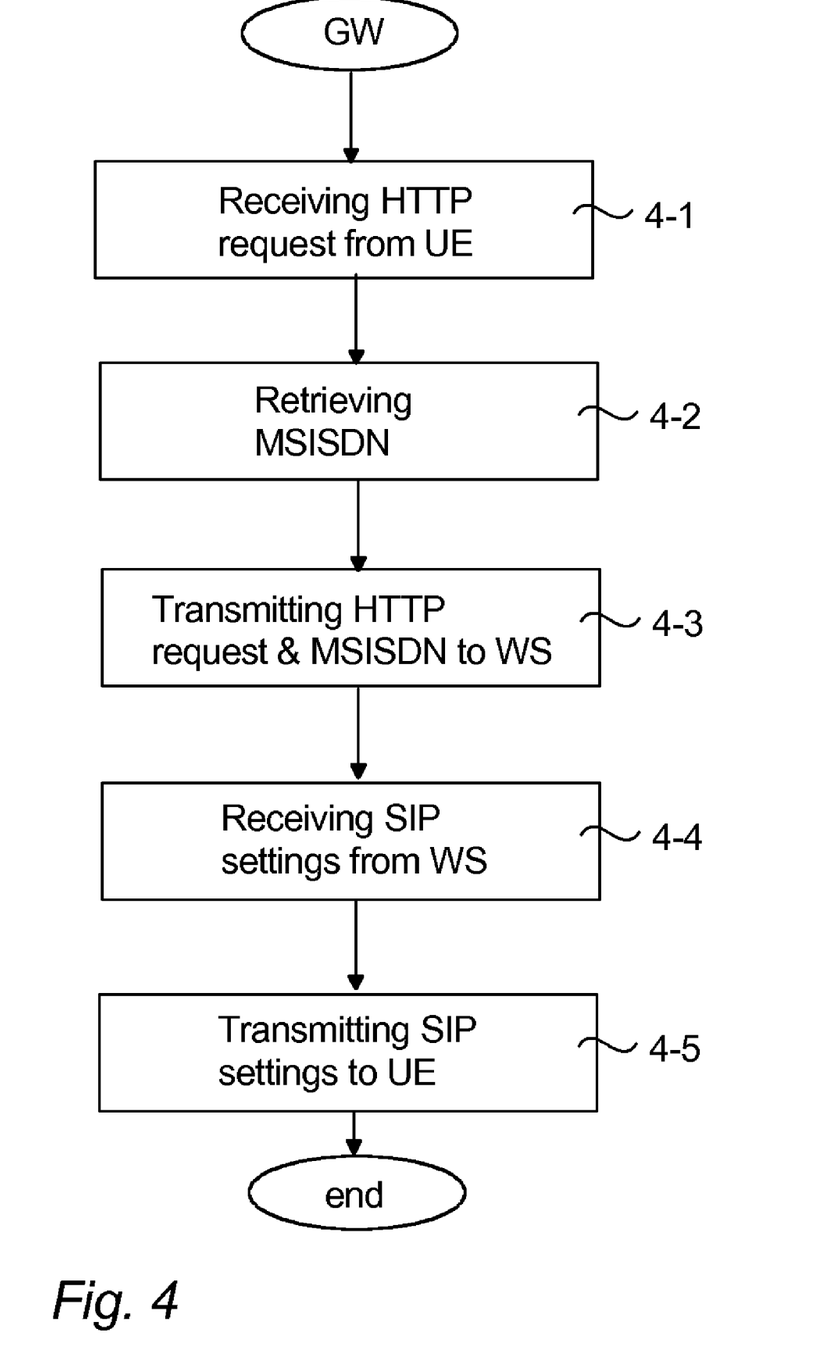
FIG. 4 is a flow chart illustrating the functioning of a gateway node according to the present solution.

FIG. 4 illustrates the functioning of a gateway node GW according to the present solution. In step 4-1, a HTTP request is received in the gateway node GW from a user terminal UE. In response to receiving the HTTP request, the gateway node GW retrieves 4-2 identification information on the user terminal UE, such as the MSISDN of the user terminal UE, and forwards 4-3 the HTTP request together with the identification information to a web server WS. In step 4-4, user terminal specific SIP settings are received from the web server WS. The gateway node GW then forwards 4-5 the SIP settings to the user terminal UE.

Figure 5:
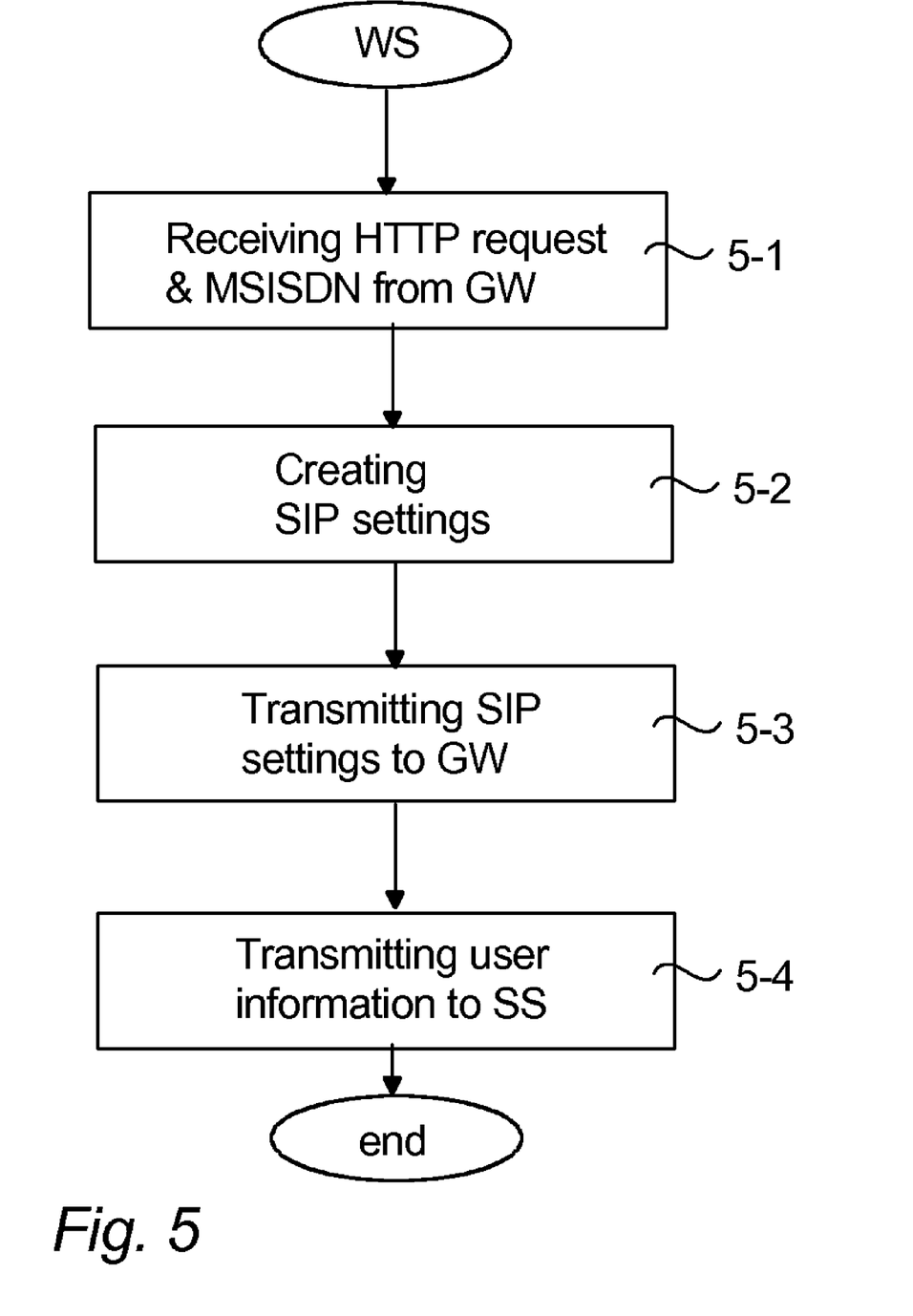
FIG. 5 is a flow chart illustrating the functioning of a settings server according to the present solution.

FIG. 5 illustrates the functioning of a web server WS according to the present solution. In step 5-1, a HTTP request and identification information (such as MSISDN) on a user terminal UE is received from a gateway node GW. In response to receiving the HTTP request and MSISDN, the web server WS creates 5-2 user terminal specific SIP settings for a specific SIP service. The created SIP settings are then transmitted 5-3 from the web server WS to the gateway node GW. In step 5-4, information on the user terminal (user identification) may be transmitted from the web server WS to a SIP server SS.

According to the present solution, the automatic configuration of user terminal SIP settings may be carried out in response to an act by the user, like the user starting to use a specific SIP service for the first time. However, the configuration of the SIP settings is carried out automatically, so that the user does not have to contribute in any way to the actual configuration process. The configuration process may also be initialised in response to an event in the network/communications system, such as the user establishing a connection to a service that s/he wishes to use. The user does not have to be aware of which settings are configured.

Thus, the module uses HTTP request for retrieving SIP settings from the web server. MSISDN is added to HTTP request by the mobile network. Based on MSISDN, the web server builds a user-specific set of SIP settings and mobile phone access point settings, which are returned to the module.

The present invention provides a solution for how application-specific SIP settings may generally be retrieved from the network. According to the solution, the user terminal identification is retrieved from the network by the gateway node, as the user terminal has already registered in a typical 2G/3G ($2^{nd}$ generation/$3^{rd}$ generation) network (and not in a SIP server). Thus the data security of the system may be improved.

In an embodiment, SIP settings are configured for a SIP application that includes a voice-over-internet protocol VoIP application.

In another embodiment, SIP settings are configured for a SIP application that includes an online game that can be downloaded and played on the user terminal.

In yet another embodiment, the configuring of application-specific network settings, servers, connection addresses, etc. is carried out by means of the present solution. The configuring is carried out by means of an application that needs the settings.

The items and steps shown in the figures are simplified and only aim at describing the idea of the present solution. The steps/points, signalling messages and related functions described above in FIGS. 1 to 5 are in no absolute chronological order, and some of the steps/points may be performed simultaneously or in an order different from the given one. Other functions may also be executed between the steps/points or within the steps/points and other signalling messages sent between the illustrated messages. Some of the steps/points or part of the steps/points can also be left out or integrated together or replaced by a corresponding step/point or part of the step/point. The apparatus operations illustrate a procedure that may be implemented in one or more physical or logical entities. The signalling messages are only exemplary and may even comprise several separate messages for transmitting the same information. The messages serve only as examples and they may contain only some of the information mentioned above. In addition, the messages may also contain other information, and the titles may differ from those given above. Instead of or in addition to a gateway node, web server, SIP server, and/or user terminal, the above-described operations may be performed in any other element of a communications system.

In addition to prior-art means, a system or system network nodes that implement the functionality of the present solution comprise means for managing user terminal SIP settings in the manner described above. Existing network nodes and user terminals comprise processors and memory that may be utilized in the operations of the present solution. Any changes necessary in implementing the present solution may be carried out using supplements or updates of software routines and/or routines included in application-specific integrated circuits (ASIC) and/or programmable circuits, such as EPLDs (electrically programmable logic device) or FPGAs (field programmable gate array).

It will be obvious to a person skilled in the art that, as the technology advances, the inventive concept can be implemented in various ways. The invention and its embodiments are not limited to the examples described above but may vary within the scope of the claims.

The invention claimed is:

1. A method for parameter setting in a communications system, the system comprising:
a user terminal capable of running application sessions;
a gateway node; and
a settings server;
wherein the method comprises:
in response to recognizing a predefined application-related action in the user terminal, transmitting from the user terminal to the gateway node a request message for initializing a retrieval of application-related control protocol settings, wherein the control protocol is a session initiation protocol (SIP);
receiving the request message in the gateway node;
in response to the receipt of the request message, retrieving identification information on the user terminal from a mobile network, wherein the identification information on the user terminal includes a mobile subscriber international integrated services digital network number MSISDN;
transmitting the request message and the identification information from the gateway node to the settings server;
receiving the request message and the identification information in the settings server;
based on the request message and the user terminal identification, defining, in the settings server, application-specific control protocol settings for the user terminal; and
transmitting the control protocol settings via the gateway node to the user terminal.

2. The method according to claim 1, wherein the method comprises:
receiving the control protocol settings in the user terminal; and
storing the control protocol settings in the user terminal, wherein respective parameter settings of the user terminal are set according to the control protocol settings.

3. The method according to claim 1, wherein the application-related action includes using the application in the user terminal for the first time.

4. The method according to claim 1, wherein the application-related action includes setting up the application in the user terminal.

5. The method as claimed in claim 1, wherein the method comprises creating, in the settings server, user terminal-specific control protocol settings; and transmitting the user terminal-specific control protocol settings to the user terminal.

6. The method as claimed in claim 1, wherein the method comprises creating, in the settings server, user terminal-specific access point settings; and transmitting the user terminal-specific access point settings to the user terminal.

7. The method according to claim 1, wherein the method comprises transmitting the user terminal-specific control protocol settings from the settings server to a control server.

8. The method according to claim 1, wherein the method comprises transmitting the user terminal-specific access point settings from the settings server to a control server.

9. The method as claimed in claim 1, wherein the application includes a voice-over-internet protocol VoIP application.

10. The method as claimed in claim 1, wherein the application includes an online game that can be downloaded and played on the user terminal.

11. A communications system comprising:
a user terminal capable of running application sessions;
a gateway node; and
a settings server;
wherein the system is configured to:
in response to recognizing of a predefined application-related action in the user terminal, transmit from the user terminal to the gateway node a request message for initializing a retrieval of application-related control protocol settings, wherein the control protocol is a session initiation protocol (SIP);
in response to receiving the request message in the gateway node, retrieve identification information on the user terminal from a mobile network, wherein the identification information on the user terminal includes a mobile subscriber international integrated services digital network number MSISDN;
transmit the request message and the identification information from the gateway node to the settings server;
in response to receiving the request message and the identification information in the settings server, define application-specific control protocol settings for the user terminal; and
transmit the control protocol settings via the gateway node to the user terminal.

12. The system according to claim 11, wherein in response to receiving the control protocol settings in the user terminal, the system is configured to store the control protocol settings in the user terminal, wherein respective parameter settings of the user terminal are set according to the control protocol settings.

13. The system as claimed in claim 11, wherein it is configured to create user terminal-specific control protocol settings; and transmit the user terminal-specific control protocol settings to the user terminal.

14. The system as claimed in claim 11, wherein it is configured to create user terminal-specific access point settings; and transmit the user terminal-specific access point settings to the user terminal.

15. The system according to claim 11, wherein it is configured to transmit the user terminal-specific control protocol settings and/or access point settings to a control server.

16. A gateway node of a communications system, the system further comprising:
a user terminal; and
a settings server;
wherein the gateway node is configured to:
receive from the user terminal a request message for initializing a retrieval of application-related control protocol settings, wherein the control protocol is a session initiation protocol (SIP);
in response to receiving the request message, retrieve identification information on the user terminal from a mobile network, wherein the identification information on the user terminal includes a mobile subscriber international integrated services digital network number MSISDN;
transmit the request message and the identification information to the settings server;

receive, from the settings server, application-specific control protocol settings defined for the user terminal; and
transmit the control protocol settings to the user terminal.

17. A settings server of a communications system, the system comprising:
a user terminal; and
a gateway node;
wherein the settings server is configured to:
receive, from the gateway node, identification information on the user terminal, and a request message for initializing a retrieval of application-related control protocol settings, the identification information on the user terminal having been retrieved from a mobile network, wherein the identification information on the user terminal includes a mobile subscriber international integrated services digital network number MSISDN, wherein the control protocol is a session initiation protocol (SIP);
based on the request message and the user terminal identification, define application-specific control protocol settings for the user terminal; and
transmit the control protocol settings to the user terminal via the gateway node.

18. The settings server as claimed in claim 17, wherein it is configured to:
create user terminal-specific control protocol settings; and
transmit the user terminal-specific control protocol settings to the user terminal.

19. The settings server as claimed in claim 17, wherein it is configured to: create user terminal-specific access point settings; and transmit the user terminal-specific access point settings to the user terminal.

20. The settings server according to claim 17, wherein it is configured to transmit the user terminal-specific control protocol settings and/or the user terminal-specific access point settings to a control server.

21. A gateway node according to claim 16, wherein the application includes a voice-over-internet protocol VoIP application.

22. A gateway node according to claim 16, wherein the application includes an online game that can be downloaded and played on the user terminal.

* * * * *